A. D. SIMONS.
Combined Horse-Hoe and Plow.

No. 160,621. Patented March 9, 1875.

WITNESSES:

INVENTOR:
A. D. Simons
BY
ATTORNEYS.

UNITED STATES PATENT OFFICE.

ALBERT D. SIMONS, OF WINDSOR, CONNECTICUT.

IMPROVEMENT IN COMBINED HORSE-HOES AND PLOWS.

Specification forming part of Letters Patent No. 160,621, dated March 9, 1875; application filed January 25, 1875.

*To all whom it may concern:*

Be it known that I, ALBERT D. SIMONS, of Windsor, in the county of Hartford and State of Connecticut, have invented a new and Improved Combined Horse-Hoe and Plow, of which the following is a specification:

My invention consists of a novel contrivance of apparatus whereby a horse-hoe and plow are combined with and attached to a beam of peculiar adaptation to be mounted on a wheel-truck for joint or independent action, and so as to be conveniently raised out of or let down into the ground, all as hereinafter described.

Figure 1:
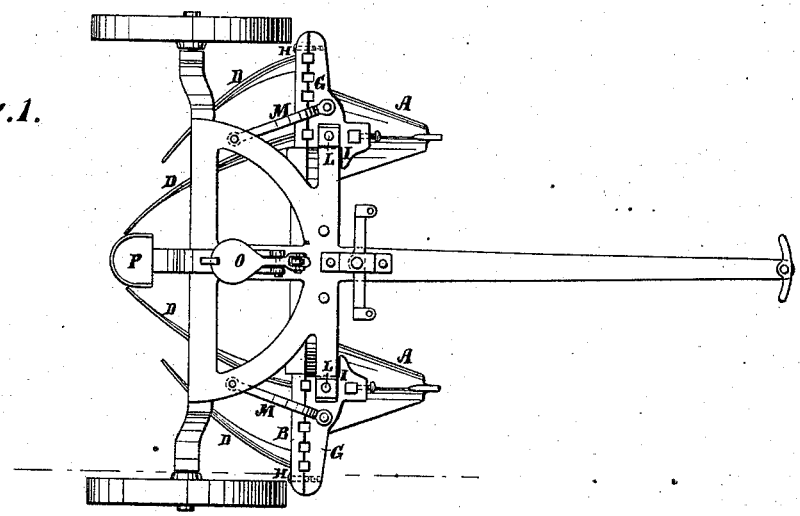
Figure 2:
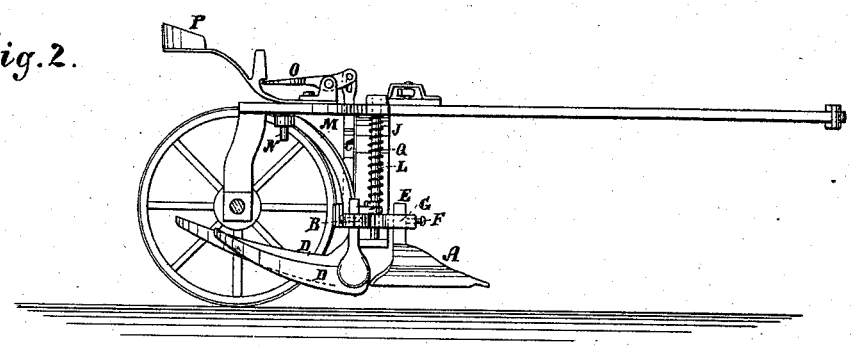
Figure 3:
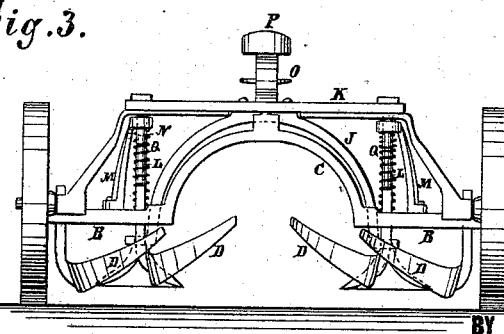

Figure 1 is a plan view of my improved machine. Fig. 2 is a section taken on the line $x$ $x$ of Fig. 1, and Fig. 3 is a rear elevation.

Similar letters of reference indicate corresponding parts.

The plows A are attached to the horizontal arms B of the arched beam C to project forward, while the hoe-blades D are attached so as to project to the rearward, for first plowing the ground, and then hoeing it up to the plants, both being secured detachably by shanks E, extending vertically through the arms, and fastened so as to be shifted high or low, as may be required.

The plow-shanks are fastened by set-screws F, and the hoe-shanks by a clamping-piece, G, of the beam fastened on by bolts H. This beam is connected to the truck so as to rise and fall readily by the clips I, projecting around to the front side of the arched support J, depending from the truck-frame K, the long rods L and the braces M and short studs N being fitted to slide up and down on the arched support J, and the rods L and the braces M being fitted to slide on the studs N, so that the foot-lever O, arranged in front of the driver's seat P and connected to the beam, will raise the plows and hoes when pressed down by the driver, and when released the springs Q will force them down again. Several holes are provided in the beam for the shanks of the hoes, in order to adjust them nearer together or farther apart, as may be demanded by the case in hand.

The machine is intended for plowing and hoeing corn, cotton, and other plants growing in rows, simultaneously on both sides by straddling them, so that the plows and hoes of opposite sides of the machine dress opposite sides of the rows.

The plows may be taken off and the hoes used alone, and the hoes may be taken off to use the plows alone, if desired.

This beam is also adapted for working the machine without the truck, in which case the tongue will be attached to it at the top of its arch.

Having thus described my invention, I claim as new, and desire to secure by Letters Patent—

1. The arched beam C, having horizontal arms B, in combination with the guide-clamps G, plows A, and hoe-blades D, substantially herein described.

2. The arched beams C, with the plows and hoes attached as described, and the guide-clamps G, in combination with the arched support J, rods L braces M, and studs N, substantially as shown and described.

3. The combination of cultivators A D, arched beam C, lever O, and spring-catch P with the truck-frame and tongue, substantially as set forth.

ALBERT D. SIMONS.

Witnesses:
SHERMAN W. ADAMS,
BENJ. DART.